(12) United States Patent
Brandon et al.

(10) Patent No.: US 9,843,064 B2
(45) Date of Patent: Dec. 12, 2017

(54) REGENERATIVE FUEL CELLS

(75) Inventors: Nigel Brandon, Sutton (GB); Anthony Kucernak, Cambridge (GB); Vladimir Yufit, London (GB)

(73) Assignee: IMPERIAL INNOVATIONS LIMITED, London (GB)

( * ) Notice: Subject to any disclaimer, the term of this patent is extended or adjusted under 35 U.S.C. 154(b) by 737 days.

(21) Appl. No.: 13/825,199

(22) PCT Filed: Sep. 19, 2011

(86) PCT No.: PCT/EP2011/066238
§ 371 (c)(1),
(2), (4) Date: Aug. 23, 2013

(87) PCT Pub. No.: WO2012/038379
PCT Pub. Date: Mar. 29, 2012

(65) Prior Publication Data
US 2013/0330644 A1   Dec. 12, 2013

(30) Foreign Application Priority Data
Sep. 21, 2010 (GB) .................................. 1015859.0

(51) Int. Cl.
*H01M 8/18* (2006.01)
(52) U.S. Cl.
CPC .............. *H01M 8/188* (2013.01); *H01M 8/18* (2013.01); *Y02E 60/528* (2013.01)
(58) Field of Classification Search
CPC ................... H01M 8/18–8/227; Y02E 60/528
USPC ................................................ 429/408–418
See application file for complete search history.

(56) References Cited

U.S. PATENT DOCUMENTS

| | | | |
|---|---|---|---|
| 3,249,522 A * | 5/1966 | Bolmer | C01B 17/34 205/343 |
| 4,485,154 A | 11/1984 | Remick et al. | |
| 4,784,924 A * | 11/1988 | Savinell | H01M 8/184 429/105 |
| 4,786,567 A | 11/1988 | Skyllas-Kazacos et al. | |
| 5,318,865 A | 6/1994 | Kaneko et al. | |
| 2009/0317668 A1* | 12/2009 | Creeth | H01M 4/8605 429/417 |

(Continued)

FOREIGN PATENT DOCUMENTS

| EP | 0664932 B1 | 1/1998 |
|---|---|---|
| EP | 1612874 A1 | 1/2006 |

OTHER PUBLICATIONS

Toshikatsu Sata. Ion Exchange Membranes. Preparation, Characterization, Modification and Application. (2004). The Royal Society of Chemistry. p. 174.*

(Continued)

*Primary Examiner* — Alix Eggerding
(74) *Attorney, Agent, or Firm* — Honigman Miller Schwartz and Cohn LLP; Andrew N. Weber; Jonathan P. O'Brien

(57) ABSTRACT

The present invention provides a regenerative fuel cell comprising an anionic membrane capable of selectively passing anions, wherein the pH of the anolyte and/or catholyte is at least 10. The present invention also relates to a method of operating a regenerative fuel cell comprising an anionic membrane capable of selectively passing anions, wherein the pH of the anolyte and/or catholyte is at least 10.

11 Claims, 7 Drawing Sheets

(56) References Cited

U.S. PATENT DOCUMENTS

2010/0021778 A1*  1/2010  Steinshnider
                              et al. .................. B01D 19/0042
                                                                429/419
2010/0062313 A1   3/2010  Browning et al.
2011/0200848 A1*  8/2011  Chiang ............... B60L 11/1875
                                                                  429/4

OTHER PUBLICATIONS

JR Varcoe et al., "An electron-beam-grafted ETFE alkaline anion-exchange membrane in metal-cation-free solid-state alkaline fuel cells," Electrochemistry Communications, (2006), vol. 8(5), pp. 839-843.
JR Varcoe et al., "Poly(ethylene-co-tetrafluoroethylene)-Derived Radiation-Grafted Anion-Exchange Membrane with Properties Specifically Tailored for Application in Metal-Cation-Free Alkaline Polymer Electrolyte Fuel Cells," Chemistry of Materials, (2007), vol. 19, pp. 2686-2693.
Eh Yu et al., "Development of direct methanol alkaline fuel cells using anion exchange membranes," Journal of Power Sources, (2004), vol. 137, pp. 248-256.
International Search Report for PCT/EP2011/066238 dated Dec. 15, 2011.

* cited by examiner

REGENERATIVE FUEL CELLS

This is a national stage application of PCT/EP2011/066238, filed internationally on Sep. 19, 2011, which claims priority to G.B. Application No. 1015859.0, filed on Sep. 21, 2010.

TECHNICAL FIELD

The present invention relates generally to the field of regenerative fuel cell (RFC) technology.

BACKGROUND ART

Regenerative fuel cells, and the methods by which they are able to store and deliver electricity, have been known for many years. They are electrochemical apparatus for energy storage and power delivery. In the power delivery phase, electrochemically active species are supplied to electrodes, where they react electrochemically to produce electrochemical power. In a storage phase, electrical power is used to regenerate the electrochemically active species, which may be stored.

Because the electrochemically active species can be stored separately from the electrode compartments and supplied when required, the generating capacity of this equipment can be quite large.

The electrochemical reactions take place on either side of an ion transport system (such as a membrane) with selective charge carriers either being transported or exchanged by the membrane.

The fundamental chemical process in these regenerative fuel cell (RFC) systems is characterised by a chemical equation where the action proceeds in one direction in the energy storage mode of the system and in the opposite direction during the power delivery mode by the system. This chemical process can be exemplified by the following redox chemical equation, wherein the term "redox" defines reactions in which a reduction and a complementary oxidation occur together.

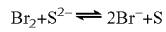  Equation 1

However the implementation of these systems in practical applications has encountered major limitations, despite what appears to be a simple direct chemical process. Practical problems including the use of hazardous materials, poor efficiencies, system size, plugging and clogging of the flow of the electrolytes, gas formation and especially the cost of materials and the cost of equipment. These have prevented RFCs from being employed widely in industry.

Currently RFCs use cation (positively charged ions) exchange or cation transfer membranes to separate the half cells containing the two electrodes. These may be polymers with negatively charged groups (typically —$CO_3^-$ or —$SO_3^-$) grafted onto the polymer and cationic species which balance the charge ($H^+$, $Na^+$ etc). Therefore, many RFCs use acidic electrolytes, as this provides an abundance of cations to be exchanged/transferred, and allows the use of many well known redox couples which are highly soluble in acidic media. For example, EP0664932B1 describes an energy generation and power storage system using a bromine/bromide or $Fe^{2+}/Fe^{3+}$ reaction in one half cell and a sulphide/polysulphide reaction in the other half cell. A cation exchange membrane separates the two half cells, and during the power delivery and the energy storage modes, the charge balance for the chemical reaction is provided by the transport of sodium, potassium, lithium or ammonium ions across the membrane.

However, a few RFCs do use mildly alkaline electrolytes. For example U.S. Pat. No. 4,485,154 discloses an electrically chargeable, anionically active, reduction oxidation system using a sulphide/polysulfide reaction in one half of the cell and an iodine/iodide, chlorine/chloride or bromine/bromide reaction in the other half of the cell. The overall chemical reaction involved, for example, for the bromine/bromide-sulfide/polysulfide system is shown in Equation 2 below:

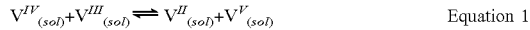  Equation 2

The system may operate at a pH of 6-12; however it is stated that the preferred pH is 7-8. This system does however still utilise a cation exchange membrane to allow cationic charge balancing species to transfer from one half cell to the other, despite the mild alkaline conditions.

Many energy storage and/or energy delivery systems avoid using alkaline electrolytes due to the tendency of many redox couples to precipitate in alkaline media.

As outlined above, one of the major limitations in employing such regenerative fuel cell in industry is the cost of the raw materials, including the ion exchange membrane. Currently, a widely deployed ion exchange membrane in industry is the proton exchange membrane (PEM) based on perfluoro sulfonic acids, for instance Nafion™ produced by DuPont. However as this membrane is costly to produce, much research has taken place to produce cheaper alternatives, including investigation into membranes which exchange anions instead of cations (anion exchange membrane). Tests have been carried out in standard fuel cells which show that these membranes are capable of selectively passing anions, whilst being substantially impermeable to cations.

Varcoe et al, *Electrochemistry* Communications, 2006, vol 8, p 839-843 describes the synthesis of anion exchange membranes which exhibit a conductivity between 0.010 and 0.035 S cm$^{-1}$ in the temperature range of 20-80° C., which corresponds to 20-33% of the levels exhibited by NAFION-115 under the same conditions. Yu E. H. et al. *Journal of Power Sciences*, 2004, vol 137(2), p 248-256 describes a direct methanol alkaline fuel cell which uses an anion exchange membrane. It was found that although the anion exchange membrane used had a higher electric resistance than NAFION membranes, the anion exchange membrane had a lower methanol diffusion coefficient. It is also indicated that expensive precious metal catalysts in the electrodes could be replaced by less expensive non-precious metal catalysts such as nickel or silver, due to methanol oxidation catalyst being less structure sensitive in alkaline media than acidic media.

It is important to realise that regenerative fuel cells are distinct from standard fuel cells. Standard fuel cells consume fuel and can normally only be run in a power delivery mode; they either cannot be run in a storage mode (in which power is stored) or, if they can, they can only do so in a highly inefficient way. Furthermore, reversing the electrochemical reaction in a fuel cell can cause permanent damage to the catalyst. Standard fuel cells are optimised for operating in the energy generating mode only while regenerative fuel cells are optimised for the combined power delivery mode and the energy storage mode. Thus only electrochemical reactions that are readily reversible can be used in a regenerative fuel cell, while in normal fuel cells the reactions need not be reversible and indeed they are usually not.

Because of these considerations, regenerative fuel cells will normally use different electrochemical reactions, as compared to standard fuel cells.

Therefore finding two redox couples for use in a regenerative fuel cell that are reversible, soluble at practical concentrations (about 1M or above), and have a suitable potential difference between the standard electrode potentials ($E^0/V$) of the couples is a challenging task.

The present invention provides a new class of electrochemical reactions that can be used in regenerative fuel cells and avoids many of the costs of present RFCs and especially uses an alternative to the expensive cation exchange membranes. The new class of electrochemical reactions can allow the use of cheaper reagents in the catholyte and/or anolyte in place of expensive previously used transition metals.

DISCLOSURE OF THE INVENTION

The present invention is defined in the accompanying claims.

The present invention relates to a regenerative fuel cell (RFC), that is to say an electrochemical apparatus configured for both energy storage and power delivery and has an anolyte compartment and a catholyte compartment separated by an anionic membrane capable of selectively passing anions, that is to say the membrane can transfer negatively charged ions, e.g. by being selectively permeable to anions or is an anion exchange material.

In accordance with standard terminology in the field of regenerative fuel cells, the terms "anode" and "cathode" are defined by the functions of the electrodes in the power delivery mode. To avoid confusion, the same terms are maintained to denote the same electrodes throughout the two modes of operation (power deliver and energy storage) of the RFC. The terms "anolyte" and "catholyte" will be used to denote the electrolyte in contact with the "anode" and "cathode".

In a power delivery mode, an electrochemically active species is oxidised at the anode and an electrochemically active species is reduced at the cathode to form reacted (or "spent") species. In the energy storage mode, electrochemical system is reversed and the "spent" anode species is electrochemically reduced at the anode and the "spent" cathode species is electrochemically oxidised at the cathode to regenerate the corresponding electrochemically active species. Negative ions are either selectively passed by, or exchanged across, the anionic membrane to complete the electrical circuit in both the energy storage mode and the power delivery mode.

Therefore, in accordance with the present invention there is provided a regenerative fuel cell capable of operating in a power delivery mode in which it generates electrical power by the reaction of electrochemically active species at an anode and at a cathode and in a energy storage mode in which it consumes electrical power to generate said electrochemically active species. The cell comprises:
 a reversible anode in an anode compartment containing an anolyte;
 a reversible cathode in a cathode compartment containing a catholyte;
 an anionic membrane separating the anode compartment from the cathode compartment, which membrane is capable of selectively passing anions; and
 conduits configured, in said power delivery mode, for carrying electrochemically active species to the anode and to the cathode and, in a energy storage mode, for carrying generated electrochemically active species away from the anode and away from the cathode,
wherein the pH of the of the catholyte and the anolyte is at least 10, such as at least 12, for example at least 13.

The electrochemically active species may be present in liquid anolyte and catholyte supplied to the respective electrode compartments. However, in respect of either the anode or the cathode (but not both), the electrochemically active species may be a gas (especially hydrogen or air (oxygen)), in which case the electrode to which the gas is supplied must be a gas-permeable electrode.

In certain embodiments of the invention, the electrochemically active species present in the catholyte is a gas (for example, hydrogen or air (oxygen)), and the electrochemically active species present in the anolyte is a liquid. In other embodiments, the electrochemically active species present in the anolyte is a gas, and the electrochemically active species present in the catholyte is a liquid. In preferred embodiments, the cathode is an air (oxygen) electrode.

When the electrochemically active species is present in the electrolyte, it may be stored in a first vessel ready for passing to the appropriate electrode compartment in the power delivery mode. However, where the electrochemically active species is gaseous, it will generally be in the form of a pressurised gas source, except when it is readily obtainable at source, notably air (oxygen), in which case there may be no need to store it in a vessel.

During the power delivery mode, the respective spent electrolyte may be collected in second vessels or, if it can be safely discharged and further supplies are readily available, e.g. if it is water, there may be no need to collect it. If the electrochemically active species is gaseous and readily available (e.g. oxygen), any non-reacted gas (such as oxygen-depleted air) can be discharged to atmosphere, if permissible, or collected if not or if it can be re-used. If the electrochemically active species is gaseous, it can be collected for storage, e.g. in a pressurised vessel.

During the energy storage mode, the spent electrolyte may be supplied from the second vessels to the respective electrode compartments, where the electrochemically active species are regenerated.

The first and second vessels may be different compartments of a single container.

When the electrochemically active species is included in the anolyte and/or the catholyte, the regenerative fuel cell of the present invention may additionally include a pump which allows the liquid electrolyte(s) to be circulated through the conduits between the storage vessels and the electrode compartments. When the electrochemically active species is a gas, a compressor may be provided that allows the gas to be stored at pressure in a vessel exterior to the electrochemical cell.

The electrochemical reactions may take place at a discrete anode and cathode or they may take place at least partly in the electrolyte or the membrane and so it may not always be easy to identify a discrete anode and cathode and the main manifestations of the anode and the cathode may simply be the anodic and cathodic current collectors, which facilitate the supply of electrons to an electrode from an external circuit and the removal of electrons from an electrode to the external circuit (in the energy storage mode, the anodic current collector will transfer electrons away from the anode, and the cathodic current collector will supply electrons to the cathode. In the power delivery mode, this will be reversed.)

When the electrochemically active species is gaseous, the associated electrode will be porous, and when the electrolyte is a liquid, it may be porous or non-porous. Examples of suitable electrodes are well known in the art, however catalysed porous carbon electrodes are particularly preferred in the present invention, for example catalysed carbon paper, cloth, felt or composite. The carbon may be graphitic, amorphous, or have glassy structure.

Specific redox couples which are useful as an anolyte and catholyte in the present invention include any two alkaline redox couples with a potential difference between the two couples of at least 0.7V in highly alkaline conditions, i.e. at a pH of 13 or greater.

The following alkaline redox couples have been shown to work in a catholyte in regenerative fuel cells, and are particularly preferred catholytes of the present invention:

$$O_2 + 4e^- + 2H_2O \rightleftharpoons 4OH^-$$

$$[Fe^{III}(CN)_6]^{4-} + e^- \rightleftharpoons [Fe^{II}(CN)_6]^{3-}$$

Other preferred alkaline redox couples useful in the present invention as a catholyte include:

$$Te^{VI}O_4^{2-} + H_2O + 2e^- \rightleftharpoons Te^{IV}O_3^{2-} + 2OH^-$$

$$I^{VII}O_3^- + 3H_2O + 6e^- \rightleftharpoons I^- + 6OH^-$$

$$Pb^{IV}O_3^{2-} + 2H_2O + 2e^- \rightleftharpoons HPb^{II}O_2^- + 3OH^-$$

In preferred embodiments of the invention, the alkaline redox couple at the cathode is:

$$O_2 + 4e^- + 2H_2O \rightleftharpoons 4OH^-.$$

A separate class of couples are based on highly water soluble organic materials which are both inexpensive, widely abundant and safe. Examples of this class of material include:

$$\text{dehydroascorbate} + 2H_2O + 2e^- \rightleftharpoons \text{ascorbate} + 2OH^-$$

$$\text{ethanal} + 2H_2O + 2e^- \rightleftharpoons \text{ethanol} + 2OH^-$$

$$\text{propanal} + 2H_2O + 2e^- \rightleftharpoons \text{propanol} + 2OH^-$$

$$\text{glyoxal} + 2H_2O + 2e^- \rightleftharpoons \text{glycoaldehyde} + 2OH^-$$

$$\text{pyruvate} + 2H_2O + 2e^- \rightleftharpoons \text{lactate} + 2OH^-$$

Particular preferred alkaline redox couples useful in the present invention in an anolyte include:

$$2H_2O + 2e^- \rightleftharpoons H_2 + 2OH^-$$

$$S_{(sol)} + 2e^- \rightleftharpoons S^{2-}$$

$$Se_{(sol)} + 2e^- \rightleftharpoons Se^{2-}$$

$$2Te_{(sol)} + 2e^- \rightleftharpoons Te_2^{2-}$$

$$Sb^{V}O_3^- + H_2O + 2e^- \rightleftharpoons Sb^{III}O_2^- + 2OH^-$$

$$Fe^{III}\text{-triethanolamine} + e^- \rightleftharpoons Fe^{II}\text{-triethanolamine}$$

$$[Cr^{III}(NH_3)_6]^{3+} + e^- \rightleftharpoons [Cr^{II}(NH_3)_6]^{2+}$$

$$[Cr^{III}(\text{picolinate})_3]^{3+} + e^- \rightleftharpoons [Cr^{II}(\text{picolinate})_3]^{2+}$$

$$[Cr^{III}(\text{picolinate})_2(OH)]_2^{4+} + 2e^- \rightleftharpoons [Cr^{II}(\text{picolinate})_2(OH)]_2^{2+}$$

In other preferred embodiments of the invention, the alkaline redox couple at the anode is:

$$S_{(sol)} + 2e^- \rightleftharpoons S^{2-}.$$

The choice of couple used will be based on a compromise between the various properties of the couple in a practical system. For example, the iron and triethanolamine (TEA) complex redox couple is cheap, has low potential and, due to the positive charge on the complex, will be less likely to cross over to the catholyte compartment, thereby reducing the problems associated with crossover contamination. However, lengthy preparation times are required to produce a stable form of the complex and the complex has reduced solubility (less than 1M) in aqueous solution. Furthermore, this complex experiences reduced stability at concentrations ≥0.4M and hence increased precipitation at pH values greater than 12. It may be impractical to use this complex at high concentrations in liquid/air systems with pH<13. Therefore, in certain embodiments of the invention, when the redox couple at the anode is $Fe^{III}$-triethanolamine+$e^- \rightleftharpoons Fe^{II}$-triethanolamine, the cathode active species is not gaseous. In other embodiments, when the redox reaction taking place at the anode is $Fe^{III}$-triethanolamine+$e^- \rightleftharpoons Fe^{II}$-triethanolamine, the pH of the anolyte is ≤13.

The $Sb^{V}O_3^- + H_2O + 2e^- \rightleftharpoons Sb^{III}O_2^- + 2OH^-$ redox couple uses cheap materials and has a low potential. However, the solubility of both the antimonate ($SbO_3^-$) and antimonite ($SbO_2^-$) complexes is low.

The cyclic voltammogram of the $[Cr(NH_3)_6]^{3+} + e^- \rightleftharpoons [Cr(NH_3)_6]^{2+}$ redox couple (at pH 10, 1M $NaNO_3$ and 0.045M $Cr[NH_3]_6^{3+}$) demonstrates reversible peaks around 0.4V vs RHE (FIG. 8). This demonstrates that this couple may be useful in the regenerative fuel cells of the invention. However, this redox couple has reduced solubility at high pH values (i.e. pH greater than 12). Therefore, in certain aspects of the present invention, when the redox couple present at the anode $[Cr(NH_3)_6]^{3+} + e^- \rightleftharpoons [Cr(NH_3)_6]^{2+}$, the cathode active species is not gaseous. In other embodiments, when the redox couple present at the anode $[Cr(NH_3)_6]^{3+} + e^- \rightleftharpoons [Cr(NH_3)_6]^{2+}$, the pH of the anolyte is ≤12.

The cost of the raw materials used in some couples is an important factor in the commercial choice of which couples to use.

It will be understood by the person skilled in the art that when the regenerative fuel cell is charged, the predominant species in the anolyte will be the reduced species of the above equations while at the end of the power delivery phase, when the regenerative fuel cell is fully discharged, the predominant species in the anolyte will be the oxidised species. The position is reversed for the catholyte, i.e. it will be the reduced species that is predominant at the end of the power delivery phase and the oxidised species that is predominant at the end of the energy storage phase.

In a preferred aspect of the invention, the anolyte and catholyte redox couples are selected from one of the following combinations:

$$2S_{(sol)} + 4e^- \rightleftharpoons 2S^{2-}$$

$$O_2 + 4e^- + 2H_2O \rightleftharpoons 4OH^- \qquad 1.$$

$$2Se_{(sol)} + 4e^- \rightleftharpoons 2Se^{2-}$$

$$O_2 + 4e^- + 2H_2O \rightleftharpoons 4OH^- \qquad 2.$$

$$4Te_{(sol)} + 4e^- \rightleftharpoons 2Te_2^{2-}$$

$$O_2 + 4e^- + 2H_2O \rightleftharpoons 4OH^- \qquad 3.$$

$$[Fe^{III}(CN)_6]^{4-} + e^- \rightleftharpoons [Fe^{II}(CN)_6]^{3-}$$

$$Fe^{III}\text{-triethanolamine} + e^- \rightleftharpoons Fe^{II}\text{-triethanolamine} \qquad 4.$$

$$2Sb^{V}O_3^- + 2H_2O + 4e^- \rightleftharpoons 2Sb^{III}O_2^- + 4OH^-$$

$$O_2 + 2H_2O + 4e^- \rightleftharpoons 4OH^- \qquad 5.$$

$$Pb^{IV}O_3^{2-} + 2H_2O + 2e^- \rightleftharpoons HPb^{II}O_2^- + 3OH^-$$

$$2H_2O + 2e^- \rightleftharpoons H_2 + 2OH^- \qquad 6.$$

$$2[Fe^{III}(CN)_6]^{4-} + 2e^- \rightleftharpoons 2[Fe^{II}(CN)_6]^{3-}$$

$$2H_2O + 2e^- \rightleftharpoons H_2 + 2OH^- \qquad 7.$$

$$Te^{VI}O_4^{2-} + H_2O + 2e^- \rightleftharpoons Te^{IV}O_3^{2-} + 2OH^-$$

$$2H_2O + 2e^- \rightleftharpoons H_2 + 2OH^- \qquad 8.$$

$$I^{VII}O_3^- + 3H_2O + 6e^- \rightleftharpoons I^- + 6OH^-$$

$$6H_2O + 6e^- \rightleftharpoons 3H_2 + 6OH^- \qquad 9.$$

Combination 4 is a practical example of two liquid/liquid couples that can be used in RFC. Both couples use relatively cheap material.

It is well known in the art that the electrochemical potential of many of the redox couples above will vary with the pH of the anolyte and/or catholyte. Therefore in a preferred aspect of the invention, the anolyte and/or catholyte are aqueous and at an alkaline pH above 10, such as at least 12, preferably at least 13, and more preferably 13-15. In other preferred embodiments, the pH in the anolyte and catholyte is at least 13.

It will be understood by the skilled person that certain redox couples (for example, oxygen) will have a lower overpotential at higher pH values. Therefore, in certain embodiments of the invention, when the redox at the cathode is:

$$O_2 + 4e^- + 2H_2O \rightleftharpoons 4OH^-,$$

the pH of the catholyte (and optionally the anolyte) is at least 13.

As set out above, it will be understood that, while the pH of the anolyte and/or catholyte should generally be in such ranges over the course of a whole energy storage/power delivery cycle, hydroxide ions are being formed and consumed during the course of that cycle and the pH may fluctuate during this cycle, and especially it will generally drop:
a) in the cathode compartment during the course of the energy storage mode and
b) in the anode compartment during the course of the power delivery mode
as hydroxide ions are consumed. The pH will generally rise:
c) in the in the cathode compartment during power delivery mode and
d) in the anode compartment during the energy storage mode
as hydroxide ions are generated. Therefore, the pH in the cathode compartment should be in one or more of the above ranges:
i) at the end of, and preferably throughout, the power delivery mode, and
ii) at the start of, and preferably throughout, the energy storage mode, and the pH in the in the anode compartment should be in one or more of the above ranges:
iii) at the end of, and preferably throughout, the energy storage mode and
iv) at the start of, and preferably throughout, the power delivery mode.

The concentration of a non-gaseous electrochemically active species in the anolyte and catholyte determines the power and energy density of the regenerative fuel cell. Therefore, the concentration of electrochemically active species in the anolyte and catholyte is preferably at least 0.5M, and more preferably greater than 1M. The maximum practical concentration of the electrochemically active species will generally be governed by its solubility in the electrolyte as precipitation from the electrolyte becomes an increasing problem at higher concentrations, and the presence of precipitated materials in the cell is preferably avoided since it interferes with the flow of the electrolyte and the functioning of the regenerative fuel cell in question.

In order to achieve an alkaline pH, for example at least 13, potassium hydroxide (KOH), aqueous lithium hydroxide (LiOH) aqueous sodium hydroxide (NaOH), or ammonia ($NH_3$), preferably aqueous KOH, may be added to the anolyte or the catholyte.

The anion-passing membrane may selectively pass hydroxide ions ($OH^-$). The anionic membrane may also be substantially impermeable to positive ions.

Anionic membranes useful in the present invention can be prepared by any method known in the art. Alkaline anion exchange membranes which are prepared by the widely utilized radiation-grafting methodology involve the modification of pre-formed films and contain no $M^{n+}$ counterions. Examples of alkaline anion exchange membranes produced by radiation grafting are outlined in Varcoe et al. (*Chem. Mater.* 2007, vol. 19, 2686-2693) and U.S. patent application Ser. No. 12/523,533.

The temperature at which the regenerative fuel cells of the present invention are operated at impacts the stability of the species present in the electrolyte. Therefore an operating temperature between about 10° C. and about 80° C. is preferred in the present invention.

In some embodiments, individual regenerative fuel cells of the present invention can be connected in series or in parallel to one another.

DESCRIPTION OF EMBODIMENTS AND EXAMPLES

Figure 1:
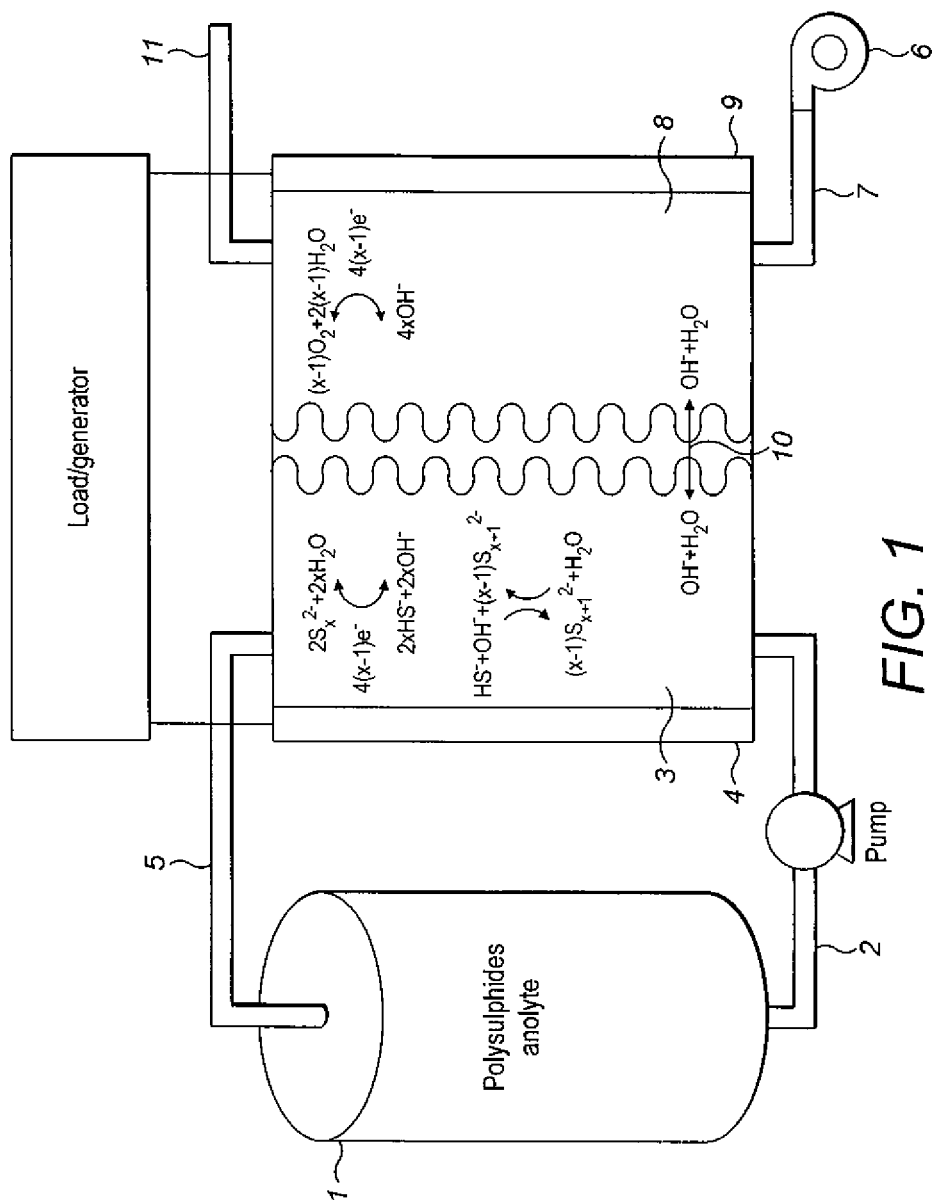
FIGS. 1 and 2 are schematic sectional views of two liquid/gas regenerative fuel cells (the terms "liquid" and "gas" denoting the phases of the electroactive material supplied to the two electrodes.

FIG. 1 shows a schematic of a regenerative fuel cell in which the electrochemically active materials used to generate power are (a) a gas (supplied to the cathode) and (b) dissolved ions in a liquid anolyte (supplied to the anode).

In the power delivery mode, the liquid anolyte containing the electrochemically active species $S^{2-}$ is pumped from a compartment of an anolyte storage container (1), through a conduit (2) and into the anolyte compartment (3), where it is oxidised at an anode (4) according to the half reaction:

$$S^{2-} \rightarrow S_{(sol)} + 2e^-$$

The anolyte containing the spent electrolyte species sulphur (S) is then carried away from the anolyte compartment through a second conduit (5) to the anolyte storage container (1), where it is stored in a compartment separate from the fresh anolyte compartment. The cathode and at least part of the catholyte compartment (8) are formed by a porous gas flow electrode and gaseous air (containing oxygen as the electrochemically active material) is pumped by an air compressor (6) through a conduit (7), to the cathode/cathode compartment (8), where the oxygen present in the air is reduced to hydroxide ions (OH⁻) according to the half reaction:

$$O_2 + 4e^- + 2H_2O \rightarrow 4OH^-$$

and the current is collected by a current collector (9).

An alkaline membrane (10) separates the anolyte and catholyte compartments (3 & 8) and selectively passes the hydroxide ions from the catholyte to the anolyte side on the membrane (10) to balance the charge, thereby completing the electrical circuit. The oxygen depleted air is carried away from the catholyte compartment (8) by a second conduit (11) and discharged to the atmosphere.

In the energy storage mode, the system is reversed so that the electrochemically active species sulphur (S) is pumped from the anolyte storage container (1), through the conduit (5) to the anolyte compartment (3), where the spent electrolyte species $S_{sol}$ is reduced at the anode (4) to form the electrochemically active species $S^{2-}$. The resulting regenerated electrolyte is transferred away from the anolyte container (3) by the pump, through the second conduit (2) to the anolyte storage container (1). Meanwhile, hydroxide ions at the catholyte side of the alkaline membrane (10) are catalysed oxidised at the porous gas cathode (9) to water and oxygen ($O_2$); the oxygen is then transferred away from the porous cathode (8) through the conduit (11) and discharged into the atmosphere.

It will be appreciated that any of the other liquid anolyte alkaline redox couples mentioned above can be substituted for the sulphur redox couple.

Figure 2:
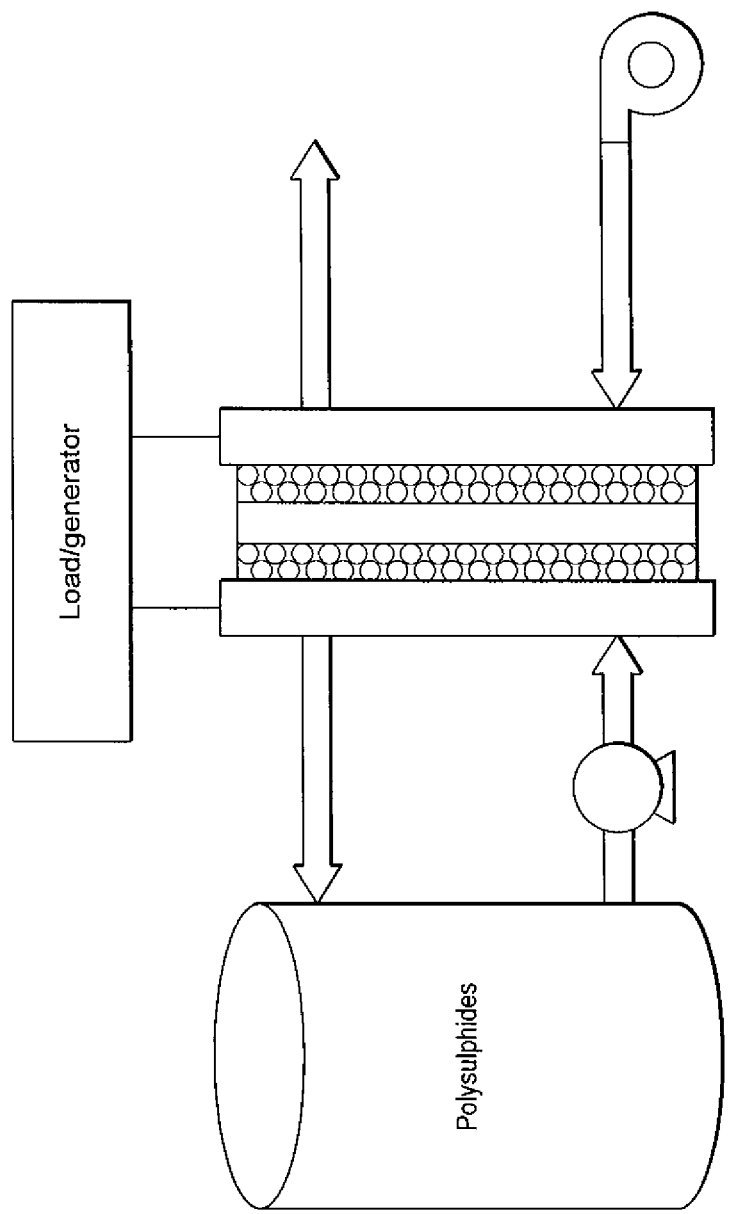

FIG. 2 shows a schematic sectional view of a liquid/gas regenerative fuel cell similar to that set out in FIG. 1 but is less schematic in that it shows the anode and cathode compartments being narrower and shows the electrodes in the form of flow channel plates combined with current collectors.

Figure 3:
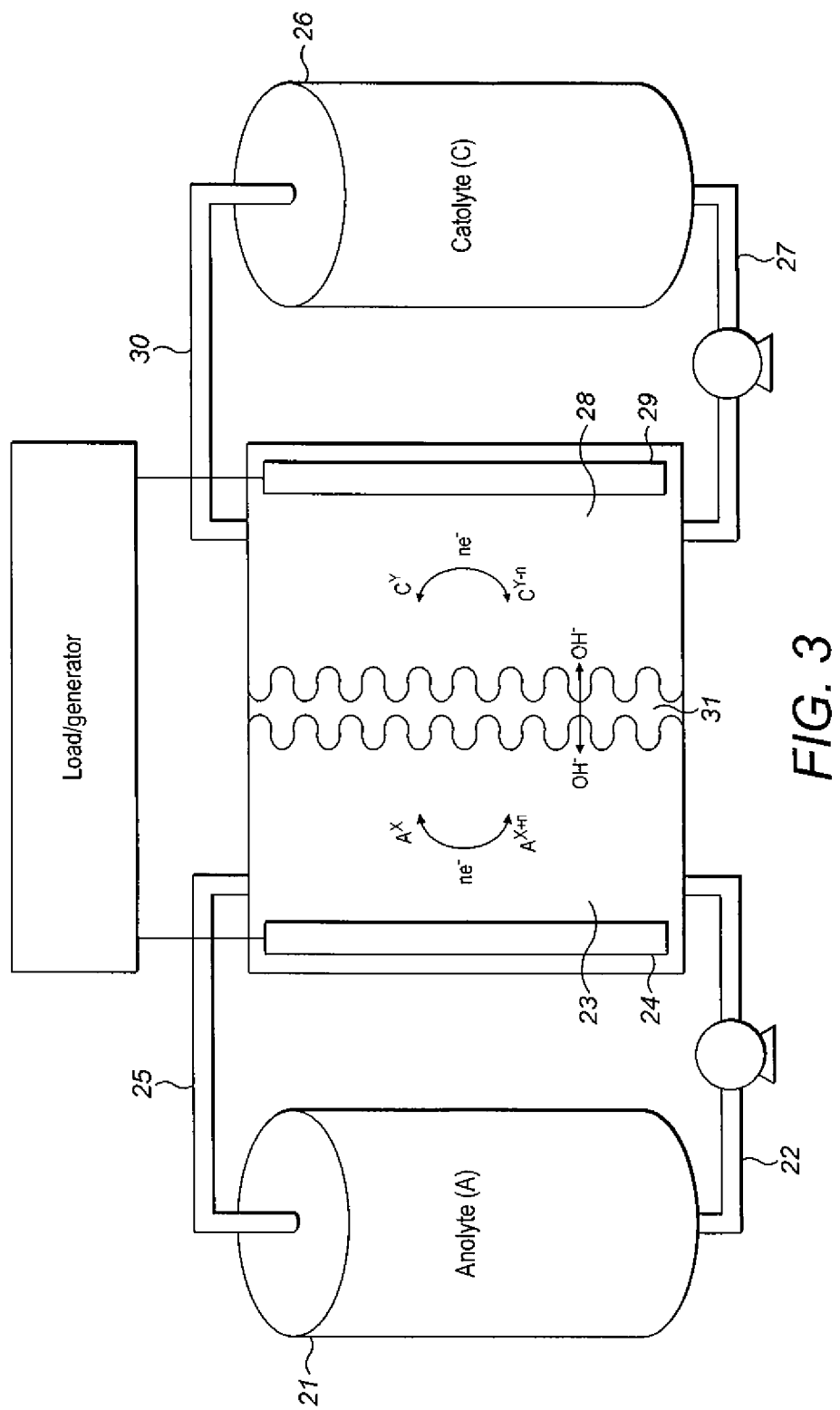
FIG. 3 is a schematic view of a liquid/liquid regenerative fuel cell.

FIG. 3 shows a schematic of a regenerative fuel cell in which the electrochemically active materials supplied respectively to the anode and to the cathode are both dissolved in an aqueous liquid electrolyte.

In the power delivery mode, the liquid anolyte containing the electrochemically active species $A^{(X+n)-}$ (where A is the electrochemically active material supplied to the anode and (X+n) is the number of negative charges that A contains) is pumped from a compartment of an anolyte storage container (21), through a conduit (22) and into the anolyte compartment (23), where it is oxidised at the anode (24) according to the half reaction:

$$A^{(X+n)-} \rightarrow A^{X-} + ne^-$$

The anolyte containing the spent electrolyte species $A^{X-}$ is then carried away from the anolyte compartment through a second conduit (25) to the anolyte storage container (21), where it is stored in a compartment separate from the fresh anolyte compartment.

The liquid catholyte containing the electrochemically active species $C^Y$ is pumped from a compartment of a catholyte storage container (26), through a conduit (27) and into the catholyte compartment (28), where it is reduced at the cathode (29) according to the half reaction:

$$C^Y + ne^- \rightarrow C^{(Y-n)}$$

The catholyte containing the spent catholyte species $C^{(Y-n)}$ is then carried away from the catholyte compartment through a second conduit (30) to the catholyte storage container (26), where it is stored in a compartment separate from the fresh catholyte compartment.

The alkaline membrane (31) separating the anolyte and catholyte compartment (23, 28) selectively passes hydroxide ions from the catholyte to the anolyte side of the membrane (11) to balance the charge and thereby completing the electrical circuit.

In the energy storage mode, the system is reversed so that the spent $A^{X-}$ is pumped from the anolyte storage container (21), through the conduit (25) to the anolyte compartment (23), where it is reduced at the anode (24) to the regenerated electrochemically active species $A^{(X-n)-}$. The resulting regenerated electrolyte is transferred away from the anolyte container (23) by the pump through the conduit (22) to the anolyte storage container (21). Meanwhile, spent $C^{(Y-n)}$ is pumped from the catholyte storage container (26), through the conduit (30) to the catholyte compartment (28), where it is oxidised at the cathode (29) to form electrochemically active species $C^Y$. The resulting regenerated catholyte is transferred away from the catholyte compartment (28) by the pump through the conduit (27) to the catholyte storage container (26).

It will be appreciated that any of the liquid anolyte or catholyte alkaline redox couples mentioned above can be used in the set up shown in FIG. 3.

Figure 4:
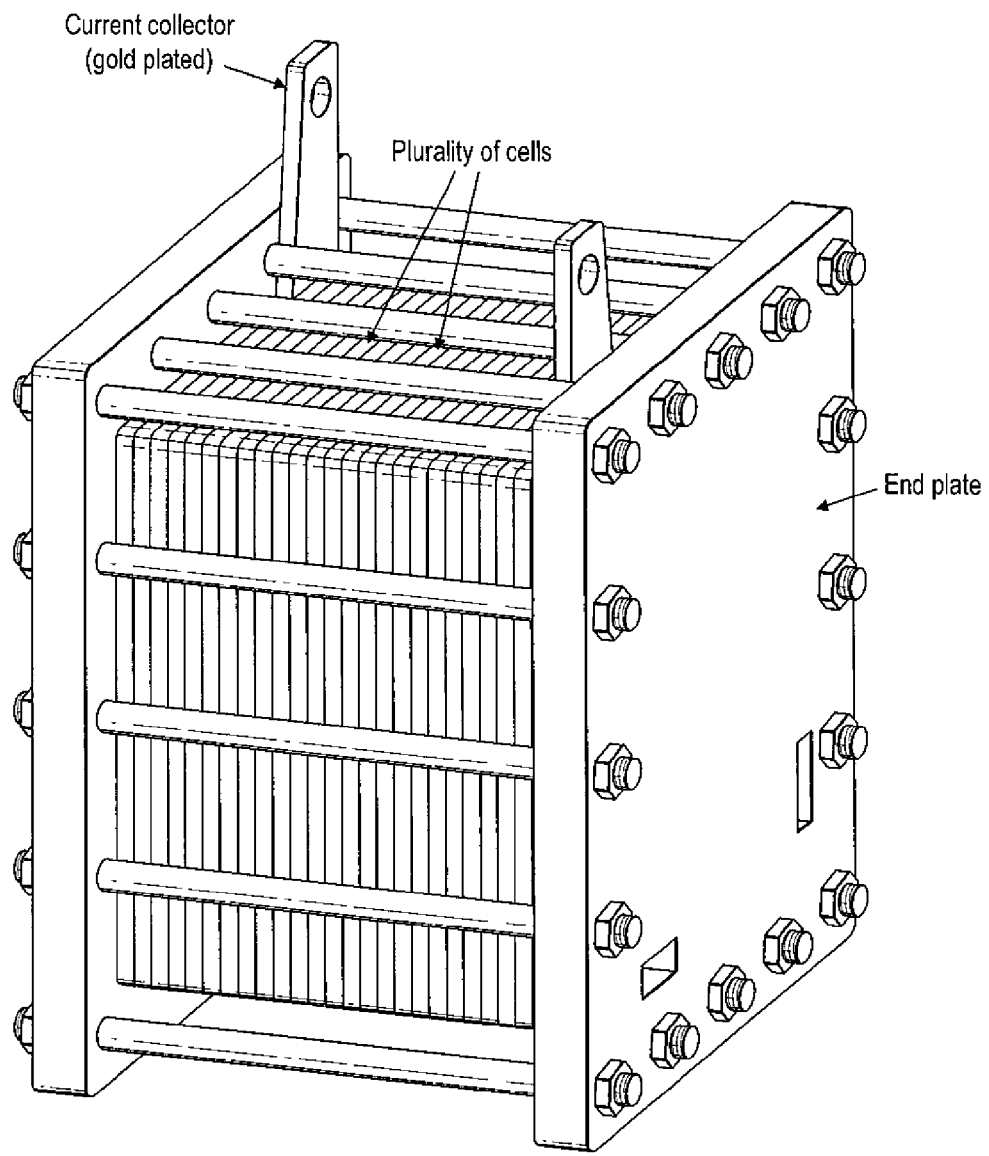
FIG. 4 is a schematic view of an assembled stack of a plurality of cells of the present invention.

FIG. 4 shows a schematic of an assembled stack of a plurality of cells of the present invention. A single anode current collector and a single cathode collector are connected to the current collectors 24, 29 of the individual cells. The stacking of cells and the feeding of electroactive species to the anode and to the cathode compartments is already well-known in the field of regenerative fuel cells and so further description will be omitted.

Figure 5:
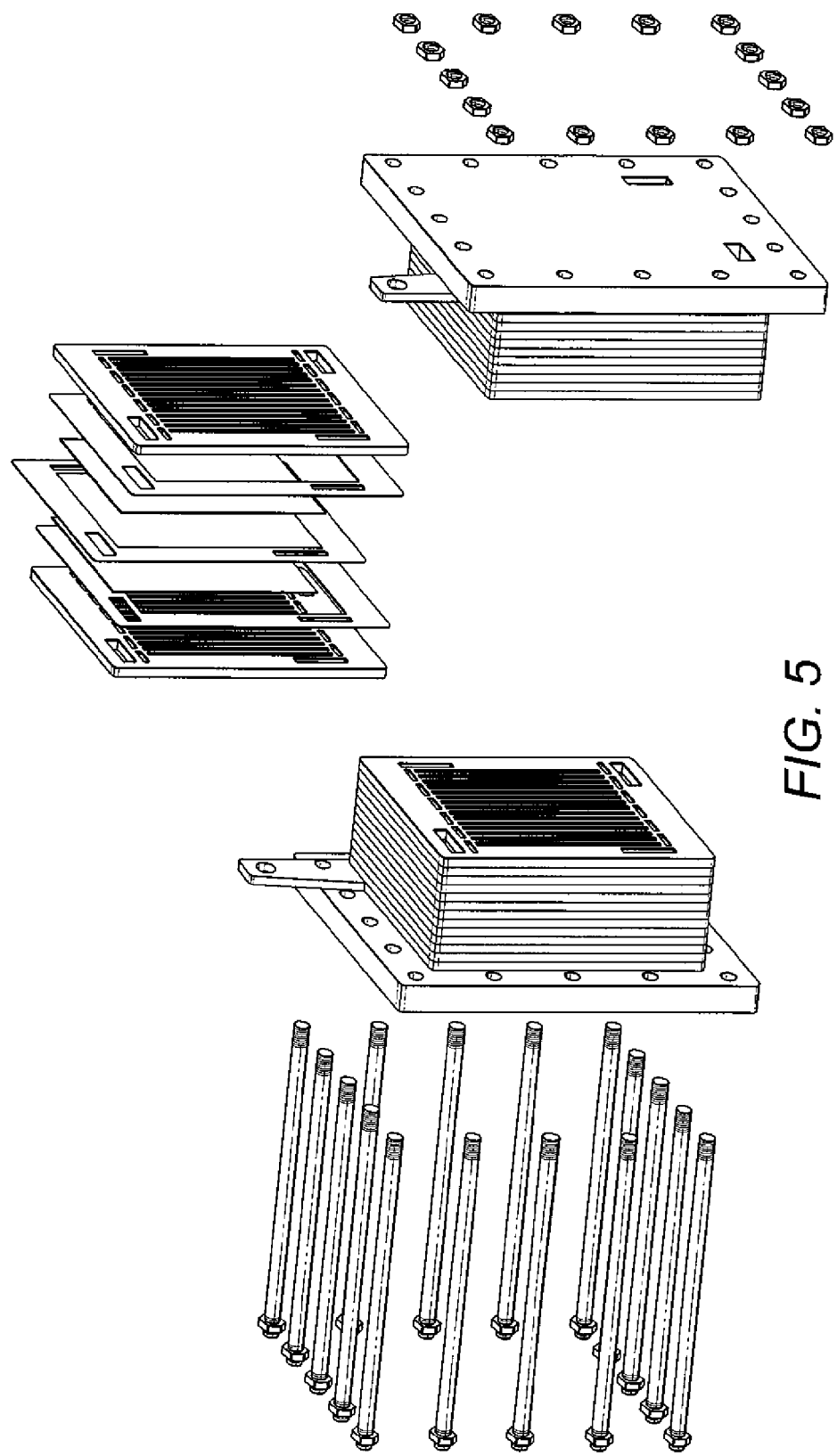
FIG. 5 is an exploded view of the assembled stack shown in FIG. 4.

FIG. 5 shows an exploded view of the assembled stack shown in FIG. 4. One of the cells towards the centre of the stack is shown in exploded view, which is shown in further detail in FIG. 6.

Figure 6:
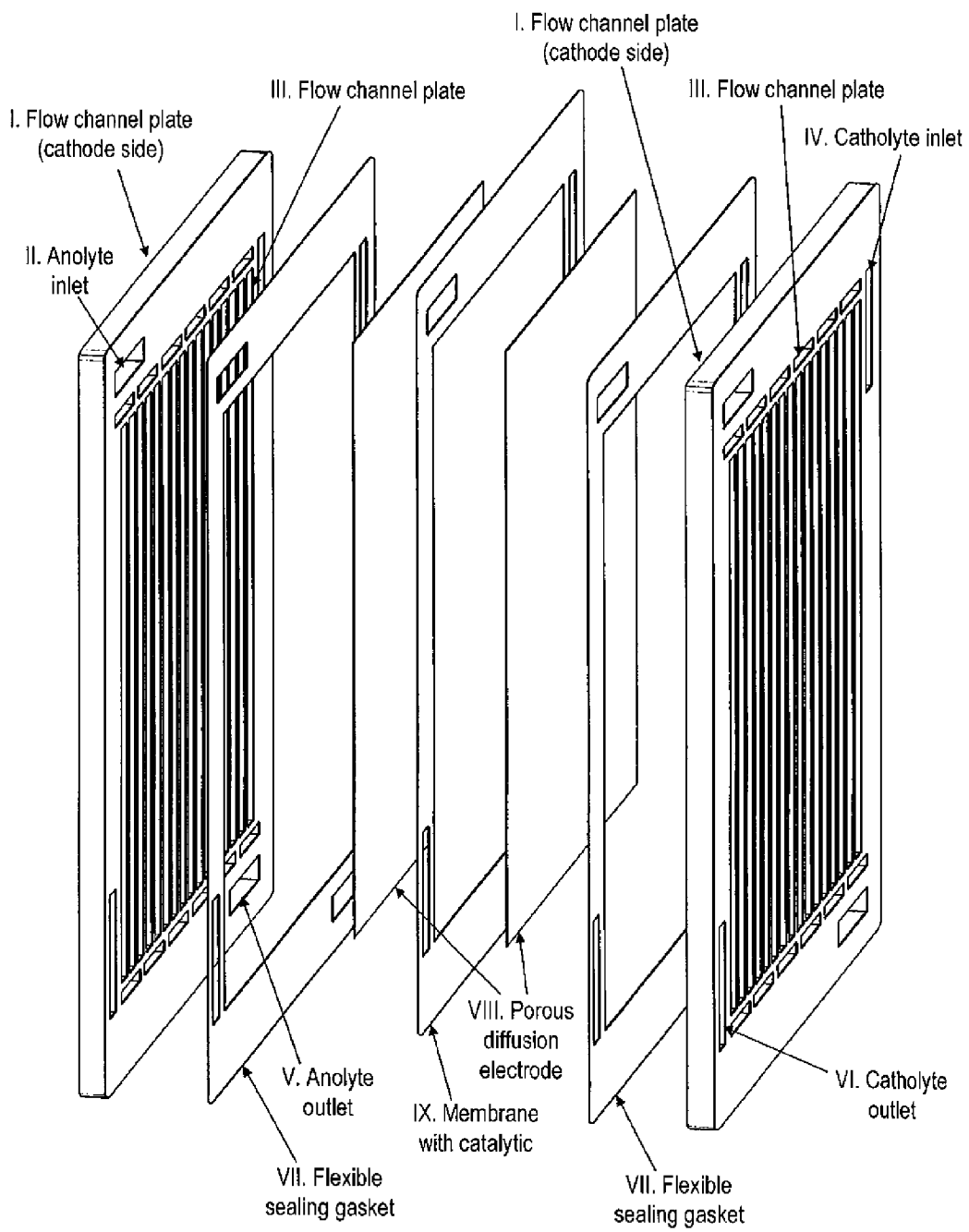
FIG. 6 is an exploded view of each of the individual cells present in the assembled stack shown in FIG. 4.

FIG. 6 shows an exploded view of the components of a single cell present in the assembled stack shown in FIG. 4. The flow channel plates are two-sided and each provides electrochemically active material to the two cells in the stack on either side of it; thus each plate has flow channels on both of its sides for providing electrochemically reactive material to a cathode located on the left hand side of the plate and different electrochemically reactive material to an anode located on the right hand side of the plate. Likewise, a flow channel is provided on the other side of the same plate for providing electrochemically reactive material to an anode located on that side of the plate. The flow channels are serpentine in shape.

In the power delivery mode, a fluid (liquid or gas) that contains electrochemically reducible material enters the flow channel of the cathode side (I) of the plate (the left hand side of the right hand plate, as seen in FIG. 6) through a catholyte inlet (IV). Similarly, a liquid anolyte containing an electrochemically oxidisable material enters an anolyte inlet (II) on the anode side of the flow channel plate (III) (the right hand side of the left hand plate as seen in FIG. 6) and passes via a separate flow channel into the anode compartment. The anolyte and the catholyte flow channels on the outsides of the two plates (as seen in FIG. 6) service the adjacent cells of the stack. The two fluids simultaneously diffuse through porous diffusion electrodes (VIII) where the electrochemically active species in the anolyte is oxidised and the electrochemically active species in the catholyte is reduced at catalytic layers adjacent to an anion exchange membrane (VII), thereby generating electrical current that passes through the current collectors (4,9,24,29) of the cells (see FIGS. 1 and 3). The spent fluids exit the flow channels through the anolyte outlet (V) and catholyte outlet (VI) respectively. Anions (which will generally be hydroxide ions) are transported though the membrane (IX) between the anode and cathode sides of the flow channel plates (I and III). The membrane itself is electrically insulating. The flexible sealing gaskets (VII) ensure hermetic sealing between the anolyte and catholyte sides of the flow channel plates (I and III) when the stack of cells is clamped together via the screws shown in FIGS. 4 and 5.

In power storage mode, the direction of the flow of material in the plates is reversed. The electrochemically active species are regenerated by reduction and oxidation of the spent materials present in the anolyte and catholyte at the catalytic layers adjacent to the anion exchange membrane (IX) respectively.

Example 1

Synthesis of an Alkaline Anion Exchange Membrane

An Alkaline Anion Exchange Membrane (AAEM) which is useful in the present invention may be synthesised according to the method set out in Varcoe et al. (*Chem. Mater.* 2007, vol. 19, 2686-2693), U.S. patent application Ser. No. 12/523,533 or European Patent Application 04103145.1.

Preparation of an Alkaline Regenerative Fuel Cell

Example of an alkaline regenerative fuel cell (ARFC) based on polysulphides-oxygen and an RFC as described in connection with FIGS. 4 to 6.

The ARFC was built with standard fuel cell (FC) parts such as endplates, graphite flow channels, catalytic gas diffusion electrodes and an alkaline membrane with active area of 5 $cm^2$. Endplates and inlet/outlet hose barbs were made from plastic (specifically PVC) and are stable both in alkaline and polysulfide solutions. Gold coated current collector plates were introduced between endplates and graphite flow channel plates to collect the current. A membrane electrode assembly (MEA) comprising an alkaline membrane and platinum catalysed gas diffusion electrodes (Pt loading 1 mg/$cm^2$, acquired from Electrochem Solutions Inc. of 10000 Wehrle Drive, Clarence N.Y. 14031, USA on both sides of the MEA, was used in the present example. This MEA was prepared in a similar way to an electron-beam-grafted ETFE alkaline anion-exchange membrane as used in the metal-cation-free solid-state alkaline fuel cells described by John R. Varcoe et al (Electrochemistry Communications; vol. 8 (2006) 839-843). The MEA was sandwiched between graphite flow channel plates. In order to prevent gas and electrolyte leakage, silicone gaskets were situated according to FIG. 6.

Figure 7:
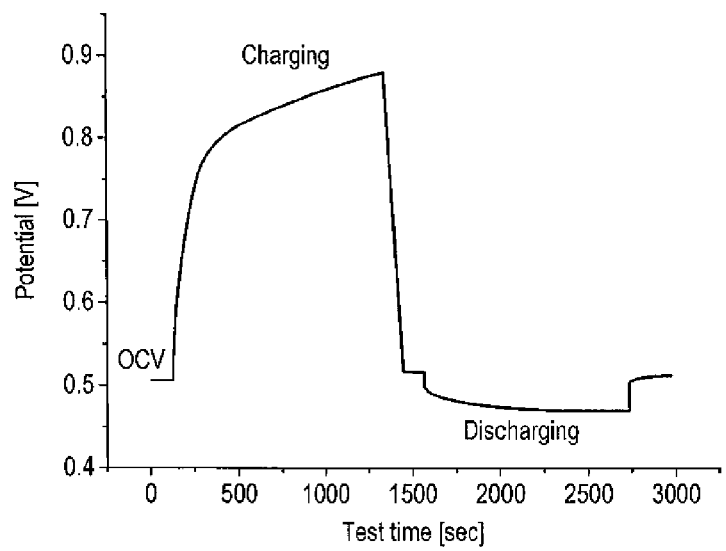
FIG. 7 shows an I-V curve of a polysulphide-air alkaline regenerative fuel cell of the present invention.
Figure 8:
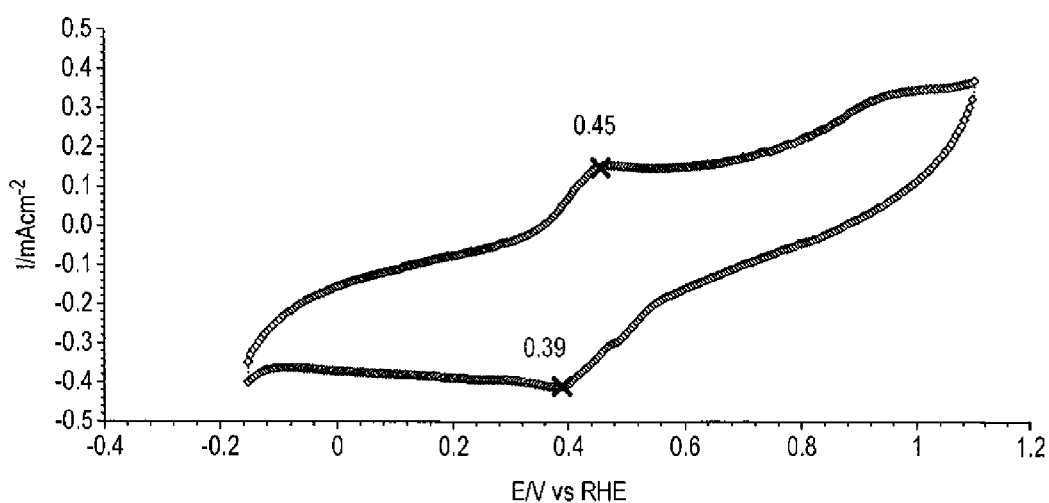
FIG. 8 shows a cyclic voltammogram for the redox couple $[Cr(NH_3)_6]^{3+} + e^- \rightleftharpoons [Cr(NH_3)_6]^{2+}$ at pH 10, 0.1M $NaNO_3$ and 0.045M $[Cr(NH_3)_6]^{3+}$ using a glassy carbon electrode. Reversible peaks around 0.4V vs RHE (−0.2 vs SHE) are seen.

The polysulphide electrolyte was prepared by dissolving elemental sulphur in an aqueous sodium sulphide_solution; NaOH was added to adjust the pH. The total concentrations of the components in the mixture were: 3M NaOH, 1.5M $Na_2S$ and 3M of S. This alkaline (pH~14) polysulphide solution was circulated through a filter (in order to prevent any insoluble substances from blocking the flow channels) to the anode side of the cell while air was pumped to the cathode side at constant flow rate in the range of 200-500 ml/min. This high rate was required to prevent catalyst poisoning at the cathode side. Both energy storage and power delivery modes were carried out at a current density of 2 mA/$cm^2$ for 20 minutes with a short period of rest where the open circuit voltage (OCV) was measured. The I-V curve of this polysulphide-air ARFC is set out in FIG. 7.

Example 2

Improvement of the Performance of the Regenerative Fuel Cell

In regenerative fuel cells, some of the ions of the redox couple present in the anolyte and/or catholyte may cross over the membrane which separates the anolyte compartment and the catholyte compartment into the catholyte and/or anolyte, respectively. This is called cross contamination and may cause a reduction in the overall operational efficiency of the regenerative fuel cell. For example, contaminants may react with the electrode catalyst and consequently reduce the activity of the catalyst (known as "catalyst poisoning").

Improvements in both the selectivity of the anion exchange membrane (thereby reducing the amount of crossover contamination) and the resistance of the catalysts towards poisoning may increase the performance of the regenerative fuel cell.

An experiment was carried out to simulate an improved membrane in an alkaline regenerative fuel cell (ARFC) based on polysulphides-oxygen redox couples. In this test, the membrane was "swept" by passing flows of electrolyte over the two sides of the membrane, thereby removing cross contaminants. The use of such a swept membrane resulted in the open circuit potential of the regenerative fuel cell being >100 mV higher than the open circuit potential of the regenerative fuel cell without the swept membrane. This experiment demonstrates that it is possible to increase the performance of the regenerative fuel cell by reducing the amount of crossover contamination which occurs during operation by improving the selectivity of the membrane. Reducing the amount of crossover contamination may also reduce the amount of catalyst poisoning.

It has been found that even small amounts of cross contamination (for example, by sulphides) may be enough to reduce the activity of catalysts such as platinum. However, we have found that, even after poisoning, such catalysts can remain active (for example, for oxygen reduction reactions) although the rate of catalysis may be reduced.

The invention claimed is:

1. A regenerative fuel cell capable of operating in a power delivery mode in which it generates electrical power by the reaction of electrochemically active species at an anode and a cathode, and in an energy storage mode in which it consumes electrical power to generate said electrochemically active species, the cell comprising:
   a reversible anode in an anode compartment containing an anolyte;
   a reversible cathode in a cathode compartment containing a catholyte;

an anionic membrane separating the anode compartment from the cathode compartment, which membrane is capable of selectively passing anions; and conduits configured, in said power delivery mode, for carrying electrochemically active species to the anode and to the cathode and, in an energy storage mode, for carrying generated electrochemically active species away from the anode and away from the cathode;

wherein the pH of the anolyte and/or the catholyte is at least 10.

2. The regenerative fuel cell of claim 1, wherein the conduits are configured:

to carry a liquid anolyte and a liquid catholyte containing respective electrochemically active species to the anode compartment and to the cathode compartment in the power delivery mode; and to carry a liquid anolyte and a liquid catholyte containing respective regenerated electrochemically active species away from the anode compartment and the cathode compartment in the energy storage mode.

3. The regenerative fuel cell of claim 1, wherein one of the anode or the cathode is a porous gas electrode and wherein one of said conduit is configured to supply a gaseous electrochemically active species to that electrode; and one of said conduit is configured to carry a liquid anolyte or a liquid catholyte containing electrochemically active species to the other of the anode or the cathode in said power delivery mode, and to carry a liquid anolyte or a liquid catholyte containing regenerated electrochemically active species away from the other of the anode or the cathode in said energy storage mode.

4. The regenerative fuel cell of claim 3, further comprising a pressurized gas source configured to contain the gaseous electrochemically active species, which gas source is connected, in the power delivery mode, to a conduit for supplying the gaseous electrochemically active species to the porous gas electrode.

5. The regenerative fuel cell of claim 1, further comprising:

at least one first vessel configured to contain a liquid electrolyte containing electrochemically active species, which first vessel is connected, in the power delivery mode, to a conduit for supplying the electrolyte to the appropriate electrode compartment, and at least one second vessel configured to receive a liquid electrolyte, which second vessel is connected, in the energy storage mode, to a conduit for receiving the electrolyte containing regenerated electrochemically active species from the appropriate electrode compartment.

6. The regenerative fuel cell of claim 1, wherein a redox couple present in the anolyte is selected from:

$2H_2O + 2e^- \rightleftharpoons H_2 + 2OH^-$, $S_{(sol)} + 2e^- \rightleftharpoons S^{2-}$, $Se_{(sol)} + 2e^- \rightleftharpoons Se^{2-}$, $2Te_{(sol)} + 2e^- \rightleftharpoons Te_2^{2-}$, $Sb^V O_3 + 2e^- \rightleftharpoons Sb^{III} O_2 + 2OH^-$, $Fe^{III}\text{-triethanolamine} + e^- \rightleftharpoons Fe^{II}\text{-triethanolamine}$, $[Cr(NH_3)_6]^{3+} + e^- \rightleftharpoons [Cr(NH_3)_6]^{2+}$, $[Cr^{III}\text{-(picolinate)}_3]^{3+} + e^- \rightleftharpoons [Cr^{II}\text{-(picolinate)}_3]^{2+}$, and $[Cr^{III}\text{-(picolinate)}_2(OH)]_2^{4+} + e^- \rightleftharpoons [Cr^{II}\text{-(picolinate)}_2(OH)]_2^{2+}$.

7. The regenerative fuel cell of claim 1, wherein a redox couple present in the catholyte is selected from:

$O_2 + 4e^- + 2H_2O \rightleftharpoons 4OH^-$, $[Fe^{III}(CN)_6]^{4-} + e^- \rightleftharpoons [Fe^{II}(CN)_6]^{3-}$, $Te^{VI}O_4^{2-} + H_2O + 2e^- \rightleftharpoons Te^{IV}O_3^{2-} + 2OH^-$, $I^{VII}O_3^- + 6H^+ + 6e^- \rightleftharpoons I^- + 3H_2O$, $Pb^{IV}O_3^{2-} + 3H^+ + 2e^- \rightleftharpoons HPb^{II}O_2^- + H_2O$, $\text{dehydroascorbate} + 2H_2O + 2e^- \rightleftharpoons \text{ascorbate} + 2OH^-$, $\text{ethanal} + 2H_2O + 2e^- \rightleftharpoons \text{ethanol} + 2OH^-$, $\text{propanal} + 2H_2O + 2e^- \rightleftharpoons \text{propanol} + 2OH^-$, $\text{glyoxal} + 2H_2O + 2e^- \rightleftharpoons \text{glycoaldehyde} + 2OH^-$, and $\text{pyruvate} + 2H_2O + 2e^- \rightleftharpoons \text{lactate} + 2OH^-$.

8. The regenerative fuel cell of claim 1, wherein a pair of redox couples present in the anolyte and catholyte is selected from the following combinations:

$2S_{(sol)} + 4e^- \rightleftharpoons 2S^{2-}$ $O_2 + 4e^- + 2H_2O \rightleftharpoons 4OH^-$, $2Se_{(sol)} + 4e^- \rightleftharpoons 2Se^{2-}$ $O_2 + 2H_2O + 4e^- \rightleftharpoons 4OH^-$, $4Te_{(sol)} + 4e^- \rightleftharpoons 2Te_2^{2-}$ $O_2 + 2H_2O + 4e^- \rightleftharpoons 4OH^-$, $2Sb^V O_3 + 2H_2O + 4e^- \rightleftharpoons 2Sb^{III} O_2 + 4OH^-$ $O_2 + 2H_2O + 4e^- \rightleftharpoons 4OH^-$, $[Fe^{III}(CN)_6]^{4-} + e^- \rightleftharpoons [Fe^{II}(CN)_6]^{3-}$ $Fe^{III}\text{-triethanolamine} + e^- \rightleftharpoons Fe^{II}\text{-triethanolamine}$, $Pb^{IV}O_2 + 3H_2O + 2e^- \rightleftharpoons HPb^{II}O_2^- + 3OH^-$ $2H_2O + 2e^- \rightleftharpoons H_2 + 2OH^-$, $2[Fe^{III}(CN)_6]^{4-} + 2e^- \rightleftharpoons 2[Fe^{II}(CN)_6]^{3-}$ $2H_2O + 2e^- \rightleftharpoons H_2 + 2OH^-$, $Te^{VI}O_4^{2-} + H_2O + 2e^- \rightleftharpoons Te^{IV}O_3^{2-} + 2OH^-$ $2H_2O + 2e^- \rightleftharpoons H_2 + 2OH^-$, and $I^{VII}O_3^- + 3H_2O + 6e^- \rightleftharpoons I^- + 6OH^-$ $6H_2O + 6e^- \rightleftharpoons 3H_2 + 6OH^-$.

9. The regenerative fuel cell claim 1, wherein the pH of the anolyte ranges from 12 to 15 throughout said energy storage mode and throughout said power delivery mode.

10. The regenerative fuel cell claim 1, wherein a redox couple present in the anolyte or catholyte comprises a gaseous species.

11. The regenerative fuel cell of claim 1, wherein a redox couple present in the catholyte is:

$O_2 + 2H_2O + 4e^- \rightleftharpoons 4OH^-$.

* * * * *